(12) United States Patent
White et al.

(10) Patent No.: US 9,457,239 B2
(45) Date of Patent: Oct. 4, 2016

(54) SPORT BALL CASING WITH INTEGRATED BLADDER MATERIAL

(71) Applicant: NIKE, Inc., Beaverton, OR (US)

(72) Inventors: Vincent F. White, Beaverton, OR (US); Scott W. Johnson, Beaverton, OR (US)

(73) Assignee: Nike, Inc., Beaverton, OR (US)

( * ) Notice: Subject to any disclaimer, the term of this patent is extended or adjusted under 35 U.S.C. 154(b) by 92 days.

(21) Appl. No.: 14/490,909

(22) Filed: Sep. 19, 2014

(65) Prior Publication Data
US 2015/0068677 A1    Mar. 12, 2015

Related U.S. Application Data

(60) Division of application No. 13/434,897, filed on Mar. 30, 2012, now Pat. No. 8,852,039, which is a continuation-in-part of application No. 13/170,912, filed on Jun. 28, 2011, now Pat. No. 8,708,847, which is a continuation-in-part of application No. 12/147,874, filed on Jun. 27, 2008, now Pat. No. 8,182,379.

(51) Int. Cl.
| | |
|---|---|
| *A63B 41/08* | (2006.01) |
| *B32B 37/06* | (2006.01) |
| *B32B 37/14* | (2006.01) |
| *B32B 37/10* | (2006.01) |
| *A63B 45/00* | (2006.01) |
| *A63B 41/10* | (2006.01) |

(52) U.S. Cl.
CPC ............. *A63B 45/00* (2013.01); *A63B 41/085* (2013.01); *A63B 41/10* (2013.01); *A63B 41/08* (2013.01); *Y10T 156/10* (2015.01)

(58) Field of Classification Search
CPC ...... A63B 41/02; A63B 41/04; A63B 41/10; A63B 45/00; A63B 41/085; A63B 41/08
See application file for complete search history.

(56) References Cited

U.S. PATENT DOCUMENTS

| | | |
|---|---|---|
| 414,748 A | 11/1889 | Bentley |
| 601,520 A | 3/1898 | Longden |
| 1,187,029 A | 6/1916 | Beebout |
| 1,517,859 A | 12/1924 | O'Shea |
| 1,575,281 A | 3/1926 | Rosenberg |

(Continued)

FOREIGN PATENT DOCUMENTS

| | | |
|---|---|---|
| BE | 535426 A | 2/1955 |
| DE | 1 169 820 B | 5/1964 |

(Continued)

OTHER PUBLICATIONS

Office Action mailed Mar. 10, 2010 in U.S. Appl. No. 12/147,874.

(Continued)

*Primary Examiner* — Steven Wong
(74) *Attorney, Agent, or Firm* — Quinn Law Group, PLLC

(57) ABSTRACT

A sport ball may include a plurality of panels having a first surface and an opposite second surface, the first surface forming a majority of an exterior surface of the ball. In addition, the sport ball may include an interior layer secured to the second surface of the panels and forming substantially all of an interior surface of the ball to retain a fluid within the ball, the interior layer extending between the panels to join the panels together. Further the sport ball may include a valve secured to the interior layer.

20 Claims, 17 Drawing Sheets

(56) References Cited

U.S. PATENT DOCUMENTS

| | | |
|---|---|---|
| 1,917,535 A | 7/1933 | Maynard |
| 1,923,236 A | 8/1933 | Sonnett |
| 1,932,226 A | 10/1933 | Pierce |
| 1,967,908 A | 7/1934 | Sneary |
| 2,012,376 A | 8/1935 | Caro |
| 2,018,559 A | 10/1935 | Horner |
| 2,073,766 A | 3/1937 | Suzuki |
| 2,080,894 A | 5/1937 | Levinson |
| 2,126,220 A | 8/1938 | Scudder |
| 2,149,465 A | 3/1939 | Riddell |
| 2,214,179 A | 9/1940 | Reach |
| 2,244,503 A | 6/1941 | Riddell |
| 2,280,314 A | 4/1942 | Scudder |
| 2,300,441 A | 11/1942 | Voit et al. |
| 2,325,073 A | 7/1943 | Reach |
| 2,344,638 A | 3/1944 | Reeder |
| 2,623,747 A | 12/1952 | Crowley |
| 2,653,818 A | 9/1953 | Tebbetts, Jr. et al. |
| 2,945,693 A | 7/1960 | Way |
| 3,508,750 A | 4/1970 | Henderson |
| 3,512,777 A | 5/1970 | Henderson |
| 4,154,789 A | 5/1979 | Delacoste |
| 4,183,156 A | 1/1980 | Rudy |
| 4,219,945 A | 9/1980 | Rudy |
| 4,258,917 A | 3/1981 | Murphy |
| 4,310,978 A | 1/1982 | Stern |
| 4,436,276 A | 3/1984 | Donahue |
| 4,462,590 A | 7/1984 | Mitchell |
| 4,513,058 A | 4/1985 | Martin |
| 4,610,071 A | 9/1986 | Miller |
| 4,660,831 A | 4/1987 | Kralik |
| 4,765,853 A * | 8/1988 | Hoffman ............... B29D 22/04  156/145 |
| 4,936,029 A | 6/1990 | Rudy |
| 5,042,176 A | 8/1991 | Rudy |
| D322,105 S | 12/1991 | Ma |
| 5,069,935 A | 12/1991 | Walters |
| 5,096,756 A | 3/1992 | Walters |
| 5,123,659 A | 6/1992 | Williams |
| 5,181,717 A | 1/1993 | Donntag |
| 5,250,070 A | 10/1993 | Parodi |
| 5,306,001 A | 4/1994 | Shishido |
| 5,494,625 A | 2/1996 | Hu |
| 5,503,699 A | 4/1996 | Ratner |
| 5,542,662 A | 8/1996 | Kouzai et al. |
| 5,580,049 A | 12/1996 | Brantley |
| 5,603,497 A | 2/1997 | Louez |
| 5,681,233 A | 10/1997 | Guenther |
| 5,713,141 A | 2/1998 | Mitchell et al. |
| 5,752,890 A | 5/1998 | Shishido et al. |
| 5,772,545 A | 6/1998 | Ou |
| 5,888,157 A | 3/1999 | Guenther et al. |
| 5,931,752 A | 8/1999 | Guenther et al. |
| 5,952,065 A | 9/1999 | Mitchell et al. |
| 6,012,997 A | 1/2000 | Mason |
| 6,013,340 A | 1/2000 | Bonk et al. |
| 6,024,661 A | 2/2000 | Guenther et al. |
| 6,082,025 A | 7/2000 | Bonk et al. |
| 6,099,423 A | 8/2000 | Ou |
| 6,127,026 A | 10/2000 | Bonk et al. |
| 6,142,897 A | 11/2000 | Lees |
| 6,203,868 B1 | 3/2001 | Bonk et al. |
| 6,206,795 B1 | 3/2001 | Ou |
| 6,261,400 B1 | 7/2001 | Kennedy, III |
| 6,302,815 B1 | 10/2001 | Shishido et al. |
| 6,321,465 B1 | 11/2001 | Bonk et al. |
| 6,406,389 B1 | 6/2002 | Feeney et al. |
| 6,422,961 B1 | 7/2002 | Feeney |
| 6,461,461 B2 | 10/2002 | Kennedy, III |
| 6,503,162 B1 | 1/2003 | Shishido et al. |
| 6,544,133 B2 | 4/2003 | Ou |
| 6,620,472 B1 | 9/2003 | Shepard et al. |
| 6,629,902 B2 | 10/2003 | Murphy et al. |
| 6,645,099 B2 | 11/2003 | Gaff et al. |
| 6,685,585 B2 | 2/2004 | Shishido et al. |
| 6,726,582 B1 | 4/2004 | Kuo et al. |
| 6,971,965 B1 | 12/2005 | Shishido |
| 6,991,569 B2 | 1/2006 | Dobrounig |
| 7,005,025 B2 | 2/2006 | Summers |
| 7,029,407 B2 | 4/2006 | Lee et al. |
| 7,066,853 B2 | 6/2006 | Chang |
| 7,137,915 B2 | 11/2006 | Lin |
| 7,503,861 B2 | 3/2009 | Swiszcz et al. |
| 7,648,434 B2 | 1/2010 | Nagao et al. |
| 7,749,116 B2 | 7/2010 | Tang et al. |
| 7,753,813 B2 | 7/2010 | Taniguchi et al. |
| 7,854,815 B2 | 12/2010 | Taniguchi et al. |
| 8,152,664 B2 | 4/2012 | Madore et al. |
| 8,182,379 B2 | 5/2012 | Raynak et al. |
| 8,708,847 B2 | 4/2014 | Berggren et al. |
| 8,777,787 B2 | 7/2014 | Raynak |
| 8,852,039 B2 | 10/2014 | White et al. |
| 2001/0002378 A1 | 5/2001 | Calandro |
| 2002/0086749 A1 | 7/2002 | Ou |
| 2002/0098928 A1 | 7/2002 | Ou |
| 2003/0078119 A1 | 4/2003 | Shishido et al. |
| 2003/0176246 A1 | 9/2003 | Gaff et al. |
| 2003/0203780 A1 | 10/2003 | Guenther et al. |
| 2004/0077288 A1 | 4/2004 | Krysiak et al. |
| 2004/0144477 A1 | 7/2004 | Taniguchi et al. |
| 2004/0229722 A1 | 11/2004 | Liu |
| 2005/0081982 A1 | 4/2005 | Chen |
| 2005/0153803 A1 | 7/2005 | Swiszcz et al. |
| 2005/0229985 A1 | 10/2005 | Saxenfelt |
| 2006/0063622 A1 | 3/2006 | Nurnberg et al. |
| 2006/0148601 A1 | 7/2006 | Ou |
| 2006/0199685 A1 | 9/2006 | Ou |
| 2006/0205544 A1 | 9/2006 | Wyner et al. |
| 2006/0205547 A1 | 9/2006 | O'Neill et al. |
| 2006/0211527 A1 * | 9/2006 | Guenther ............... A63B 41/08  473/597 |
| 2006/0229149 A1 | 10/2006 | Goedoen et al. |
| 2006/0229150 A1 | 10/2006 | Ou |
| 2006/0293132 A1 | 12/2006 | Laliberty et al. |
| 2007/0037642 A1 | 2/2007 | Chang |
| 2007/0049434 A1 | 3/2007 | Maziarz et al. |
| 2007/0072712 A1 | 3/2007 | Chernick et al. |
| 2007/0129188 A1 | 6/2007 | Maziarz et al. |
| 2007/0225094 A1 | 9/2007 | Nix |
| 2007/0238562 A1 | 10/2007 | Nagao et al. |
| 2007/0246296 A1 | 10/2007 | Xiao et al. |
| 2008/0176685 A1 | 7/2008 | Madore et al. |
| 2008/0188334 A1 * | 8/2008 | Feeney ............... A63B 41/08  473/605 |
| 2008/0287230 A1 | 11/2008 | Guenther et al. |
| 2009/0011878 A1 | 1/2009 | Ou |
| 2009/0209374 A1 | 8/2009 | Ou |
| 2009/0325740 A1 | 12/2009 | Krysiak |
| 2009/0325744 A1 | 12/2009 | Raynak et al. |
| 2010/0240479 A1 | 9/2010 | Raynak et al. |
| 2011/0152018 A1 | 6/2011 | Walling et al. |
| 2011/0250997 A1 | 10/2011 | Walling et al. |
| 2012/0202627 A1 | 8/2012 | Raynak et al. |
| 2012/0258824 A1 | 10/2012 | Berggren et al. |
| 2013/0005521 A1 | 1/2013 | White et al. |
| 2013/0148947 A1 | 6/2013 | Glen et al. |

FOREIGN PATENT DOCUMENTS

| | | |
|---|---|---|
| DE | 10 2004 056 951 A1 | 6/2006 |
| EP | 0 598 542 A2 | 5/1994 |
| EP | 0 941 749 A1 | 9/1999 |
| EP | 1 080 745 A1 | 3/2001 |
| FR | 2 572 674 A1 | 5/1986 |
| JP | 10-337341 A | 12/1998 |
| WO | 2004/056424 A1 | 7/2004 |
| WO | 2007/146095 A1 | 12/2007 |
| WO | 2009/158103 A1 | 12/2009 |
| WO | 2011/028640 A1 | 3/2011 |
| WO | 2013/003221 A1 | 1/2013 |
| WO | 2013/148947 A2 | 10/2013 |

OTHER PUBLICATIONS

Amendment filed Jun. 4, 2010 in U.S. Appl. No. 12/147,874.

(56) References Cited

OTHER PUBLICATIONS

Office Action mailed Aug. 19, 2010 in U.S. Appl. No. 12/147,874.
Amendment filed Nov. 19, 2010 in U.S. Appl. No. 12/147,874.
Final Office Action mailed Jan. 25, 2011 in U.S. Appl. No. 12/147,874.
Amendment filed Mar. 22, 2011 in U.S. Appl. No. 12/147,874.
Amendment filed Apr. 19, 2011 in U.S. Appl. No. 12/147,874.
Office Action mailed Sep. 6, 2011 in U.S. Appl. No. 12/147,874.
Amendment filed Dec. 1, 2011 in U.S. Appl. No. 12/147,874.
Notice of Allowance mailed Jan. 23, 2012 in U.S. Appl. No. 12/147,874.
Office Action mailed Jun. 27, 2012 in U.S. Appl. No. 13/451,206.
Amendment filed Sep. 20, 2012 in U.S. Appl. No. 13/451,206.
Final Office Action mailed Oct. 31, 2012 in U.S. Appl. No. 13/451,206.
Amendment filed Jan. 31, 2013 in U.S. Appl. No. 13/451,206.
Office Action mailed May 30, 2013 in U.S. Appl. No. 13/451,206.
Amendment filed Aug. 29, 2013 in U.S. Appl. No. 13/451,206.
Office Action mailed Oct. 15, 2013 in U.S. Appl. No. 13/451,206.
Amendment filed Dec. 27, 2013 in U.S. Appl. No. 13/451,206.
Notice of Allowance mailed Mar. 5, 2014 in U.S. Appl. No. 13/451,206.
Office Action mailed Aug. 26, 2013 in U.S. Appl. No. 13/170,912.
Amendment filed Nov. 26, 2013 in U.S. Appl. No. 13/170,912.
Notice of Allowance mailed Dec. 16, 2013 in U.S. Appl. No. 13/170,912.
International Search Report and Written Opinion mailed Oct. 6, 2009 in PCT/US2009/045393.
International Preliminary Report on Patentability (including Written Opinion of the ISA) mailed Jan. 13, 2011 in International Application No. PCT/US2009/045393.
International Search Report and Written Opinion mailed Oct. 19, 2012 in PCT/US2012/043700.
International Preliminary Report on Patentability (including Written Opinion of the ISA) mailed Jan. 16, 2014 in International Application No. PCT/US2012/043700.
Amended claims filed Jan. 21, 2014 in European Patent Application No. 12748284.2.
Response to Written Opinion and Voluntary Amendments filed Aug. 28, 2014 in European Patent Application No. 12748284.2.
Voluntary Amendments filed Apr. 18, 2014 in Japanese Patent Application No. 2014-518867.
Voluntary Amendments filed Jun. 30, 2014 in Chinese Patent Application No. 2012800321228.
International Search Report and Written Opinion mailed Dec. 13, 2013 in PCT/US2013/034276.
International Preliminary Report on Patentability (including Written Opinion of the ISA) mailed Oct. 9, 2014 in International Application No. in PCT/US2013/034276.

\* cited by examiner

SPORT BALL CASING WITH INTEGRATED BLADDER MATERIAL

CROSS-REFERENCE TO RELATED APPLICATION

This application is a divisional of White et al., U.S. Patent Application Publication No. 2013/0005521, published on Jan. 3, 2013 and entitled "Sport Ball Casing with Integrated Bladder Material," which is a continuation-in-part of Berggren et al., U.S. Pat. No. 8,708,847, issued Apr. 29, 2014 and entitled "Sport Ball Casing and Methods of Manufacturing the Casing," which is a continuation-in-part of Rapaport et al., U.S. Pat. No. 8,182,379, issued May 22, 2012, and entitled "Sport Balls and Methods of Manufacturing the Sport Balls." The entire disclosures of the publication and patents listed above are incorporated herein by reference.

BACKGROUND

A variety of inflatable sport balls, such as soccer balls, conventionally exhibit a layered structure that includes a casing, a restriction structure, and a bladder. The casing forms an exterior portion of the sport ball and is generally formed from a plurality of durable and wear-resistant panels joined together along abutting edges (e.g., with stitching or adhesives). Although panel configurations may vary significantly, the casing of a traditional soccer ball includes thirty-two panels, twelve of which have a pentagonal shape and twenty of which have a hexagonal shape.

The restriction structure forms a middle portion of the sport ball and is positioned between the casing and the bladder. Among other purposes, the restriction structure may provide a softened feel to the sport ball, impart energy return, and restrict expansion of the bladder. In some configurations, the restriction structure or portions of the restriction structure may be bonded, joined, or otherwise incorporated into the casing as a backing material.

The bladder, which has an inflatable configuration, is located within the restriction structure to provide an interior portion of the sport ball. In order to facilitate inflation (i.e., with pressurized air), the bladder generally includes a valved opening that extends through each of the restriction structure and casing, thereby being accessible from an exterior of the sport ball.

SUMMARY

In one aspect, the present disclosure is directed to a sport ball. The sport ball may include a plurality of panels having a first surface and an opposite second surface, the first surface forming a majority of an exterior surface of the ball. In addition, the sport ball may include an interior layer secured to the second surface of the panels and forming substantially all of an interior surface of the ball to retain a fluid within the ball, the interior layer extending between the panels to join the panels together. Further the sport ball may include a valve secured to the interior layer.

In another aspect, the present disclosure is directed to a sport ball including a casing. The casing may include a first panel and a second panel that each has an exterior surface facing outward and an opposite interior surface facing inward. The interior surface of the first panel may be bonded to the interior surface of the second panel to form a seam that joins the first panel and the second panel together. In addition, the interior surface may be defined by an inner layer including a bladder material for enclosing a pressurized fluid within the casing. The bladder material may include a first layer of thermoplastic polymer material and a second layer of ethylene-vinyl alcohol copolymer.

In another aspect, the present disclosure is directed to a method of manufacturing a sport ball. The method may include forming a casing by joining at least a first panel and at least a second panel, each panel having a first surface and an opposite second surface. The method may also include orienting the first panel and the second panel such that (a) the first surface of the first panel and the first surface of the second panel face outward toward an exterior of the sport ball and (b) the second surface of the first panel and the second surface of the second panel face inward toward an interior of the sport ball. The step of joining the first panel to the second panel may include forming a bond between the second surface of the first panel and the second surface of the second panel to form an interior layer forming substantially all of an interior surface of the ball to retain a fluid within the ball.

In another aspect, the present disclosure is directed to a method of manufacturing a sport ball. The method may include providing a first panel and a second panel, the first panel defining a first flange and the second panel defining a second flange. The method may also include forming a seam between the first panel and the second panel by placing the first flange in contact with the second flange, compressing the first flange and the second flange together, and heating the first flange and the second flange. Further, the method may include removing at least a portion of the first flange and the second flange to define a protruding portion of the seam. Also, the method may include orienting the protruding portion of the seam toward an exterior of the sport ball. An inner layer of the first panel and the second panel may include a bladder material for enclosing a pressurized fluid within a chamber defined by the casing. The bladder material may include a first layer of thermoplastic polymer material and a second layer of ethylene-vinyl alcohol copolymer. In addition, forming the seam includes sealing bladder material on the first flange portion to bladder material on the second flange portion.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

FIGURE DESCRIPTIONS

The foregoing Summary and the following Detailed Description will be better understood when read in conjunction with the accompanying figures.

DETAILED DESCRIPTION

Figure 1:
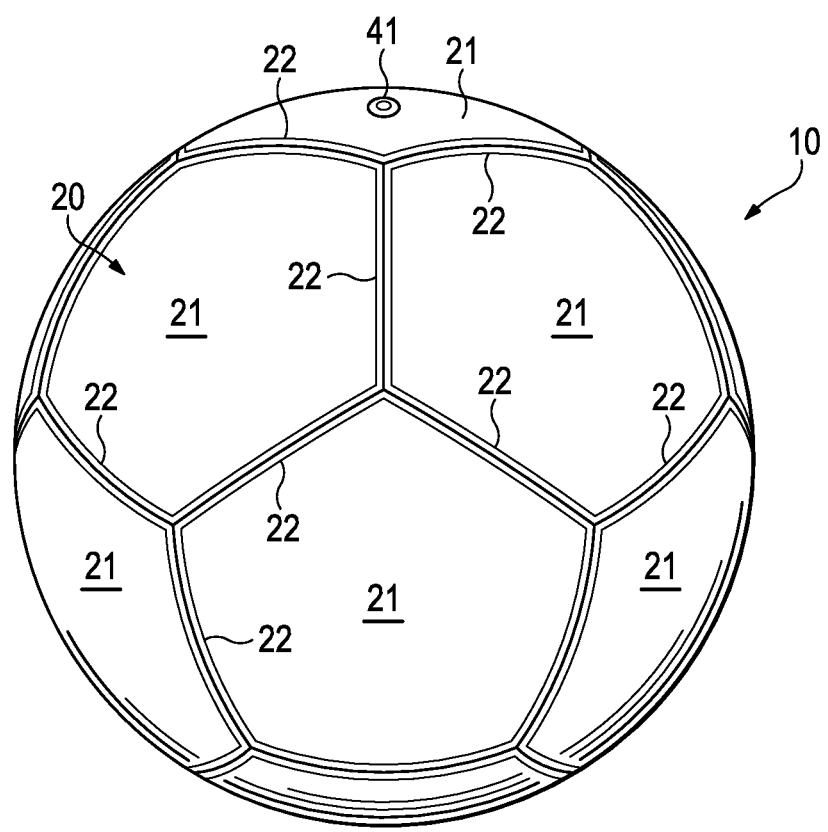
FIG. 1 is a perspective view of a sport ball.
Figure 2:
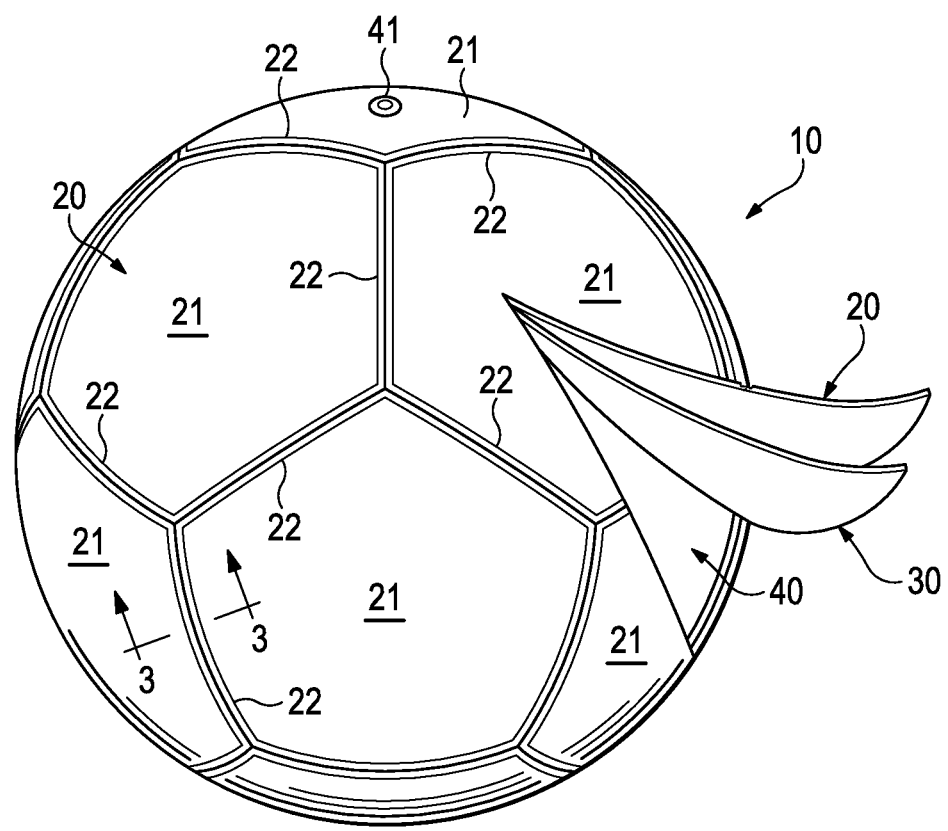
FIG. 2 is another perspective view of the sport ball.

The following discussion and accompanying figures disclose a sport ball and method for manufacturing of the sport ball. Although the sport ball is discussed and depicted as being a soccer ball, concepts associated with the sport ball and method for manufacturing may be applied to various types of inflatable sport balls. In addition to soccer balls, therefore, concepts discussed herein may be incorporated into basketballs, footballs (for either American football or rugby), volleyballs, and water polo balls, for example. A variety of non-inflatable sport balls, such as baseballs and softballs, may also incorporate concepts discussed herein.

Sport Ball Configuration

A sport ball 10 having the general configuration of a soccer ball is depicted in FIGS. 1-3B. Sport ball 10 exhibits a layered structure having (a) a casing 20 that forms an exterior portion of sport ball 10, (b) a restriction structure 30 located within casing 20 and forming an intermediate portion of sport ball 10, and (c) a bladder 40 that is inflatable and forms an interior portion of sport ball 10. Upon pressurization, bladder 40 induces sport ball 10 to take on a substantially spherical shape. More particularly, pressure within bladder 40 causes bladder 40 to place an outward force upon restriction structure 30. In turn, restriction structure 30 places an outward force upon casing 20. In order to limit expansion of bladder 40 and also limit tension in casing 20, restriction structure 30 may have a limited degree of stretch. In other words, bladder 40 places an outward force upon restriction structure 30, but the stretch characteristics of restriction structure 30 effectively prevent the outward force from inducing significant tension in casing 20. As such, restriction structure 30 restrains pressure from bladder 40, while permitting outward forces to induce a spherical shape in casing 20, thereby imparting a spherical shape to sport ball 10.

Casing 20 is formed from various panels 21 that are joined together along abutting sides or edges to form a plurality of seams 22. That is, edge areas of panels 21 are joined to each other to form seams 22. Although panels 21 are depicted as having the shapes of twelve equilateral pentagons, panels 21 may have non-equilateral shapes, concave or convex edges, or a variety of other shapes (e.g., triangular, square, rectangular, hexagonal, trapezoidal, round, oval, non-geometrical) that combine in a tessellation-type manner to form casing 20. In some configurations, sport ball 10 may have twelve pentagonal panels 21 and twenty hexagonal panels 21 to impart the general configuration of a traditional soccer ball. Selected panels 21 may also be formed of unitary (i.e., one piece) construction with adjacent panels 21 to form bridged panels that reduce the number of seams 22. Accordingly, the configuration of casing 20 may vary significantly.

The materials selected for casing 20 may include leather, synthetic leather, polyurethane, polyvinyl chloride, and other materials that are generally durable and wear-resistant. In many configurations, each of panels 21 may be formed from a single material, such as layer of synthetic leather. In some configurations, however, each of panels 21 may have a layered configuration that combines two or more materials. For example, FIG. 3 depicts casing 20 as having a layered structure that includes an outer layer 23, a middle layer 24, and an inner layer 25. Although the materials selected for layers 23-25 may vary considerably, outer layer 23 may be formed from synthetic leather, middle layer 24 may be formed from a polymer foam material, and inner layer 25 may be a textile (e.g., a woven, non-woven, or knit textile). Accordingly, various materials and combinations of materials may be utilized in casing 20.

A distinction between conventional casings and casing 20 relates to the manner in which panels 21 are joined to form seams 22. The panels of conventional sport balls are often joined with stitching (e.g., hand or machine stitching). In contrast, a bonding process (e.g., adhesive bonding or thermal bonding) is utilized in the manufacture of sport ball 10 to join panels 21 and form seams 22. An example of the configuration of seams 22 is depicted in the cross-section of FIG. 3, wherein the bonding process has effectively secured, adhered, welded, or otherwise joined two of panels 21 to each other. Although the bonding process may be utilized to form all of seams 22, some of panels 21 may be joined through stitching or other processes, or various seams 22 that are formed through the bonding process may be supplemented with stitching.

The configuration of seams 22 varies from conventional seams in another aspect. In many sport balls, seams effectively protrude inward. That is, portions of panels that form an exterior surface lay against each other, are joined to each other, and curve inward form seams that extend into the sport ball. In contrast, seams 22 effectively curve outward, thereby protruding outward. Referring again to FIG. 3, inner layers 25, which form an interior surface of casing 20, lay against each other and are joined to each other. That is, the interior surfaces of panels 21 lay against each other and are joined to each other to form seams 22, which have an outwardly-protruding configuration. Additionally, the configuration of seams 22 exposes a portion of an edge of each panel 21 on the exterior of sport ball 10. That is, the edges of panels 21 form a portion of an outer surface of sport ball 10 at seams 22.

One advantage of utilizing a bonding process to form seams 22 relates to the overall mass of sport ball 10. Whereas approximately ten to fifteen percent of the mass of a conventional sport ball may be from the seams between panels, bonding panels 21 may reduce the mass at seams 22. By eliminating stitched seams in casing 20, the mass that would otherwise be imparted by the stitched seams may be utilized for other structural elements that enhance the performance properties (e.g., energy return, sphericity, mass distribution, durability, aerodynamics) of sport ball 10. Another advantage relates to manufacturing efficiency. Stitching each of the seams of a conventional sport ball is a relatively time-consuming process, particularly when hand stitching is utilized. By bonding panels 21 together at seams 22, the time necessary for forming casing 20 may be deceased, thereby increasing the overall manufacturing efficiency.

Restriction structure 30 forms a middle layer of sport ball 10 and is positioned between casing 20 and bladder 40. In general, restriction structure 30 is formed from materials with a limited degree of stretch in order to restrict expansion of bladder 40, but may have a variety of configurations or purposes. As examples, restriction structure 30 may be formed from (a) a thread, yarn, or filament that is repeatedly wound around bladder 40 in various directions to form a mesh that covers substantially all of bladder 40, (b) a plurality of generally flat or planar textile elements stitched together to form a structure that extends around bladder 40, (c) a plurality of generally flat or planar textile strips that are impregnated with latex and placed in an overlapping configuration around bladder 40, or (d) a substantially seamless spherically-shaped textile. In some configurations of sport ball 10, restriction structure 30 may also be bonded, joined, or otherwise incorporated into either of casing 20 and bladder 40, or restriction structure 30 may be absent from sport ball 10. Accordingly, the construction of restriction structure 30 may vary significantly to include a variety of configurations and materials.

Bladder 40 has an inflatable configuration and is located within restriction structure 30 to provide an inner portion of sport ball 10. When inflated, bladder 40 exhibits a rounded or generally spherical shape. In order to facilitate inflation, bladder 40 includes a valve 41 that extends through restriction structure 30 and casing 20, thereby being accessible from an exterior of sport ball 10. In other configurations, bladder 40 may have a valveless structure that is semi-permanently inflated. Bladder 40 may be formed from a variety of materials, including rubber, carbon latex, polyurethane, urethane, polyester, polyester polyurethane, polyether polyurethane, and mixtures or layered configurations thereof, for example. Although these materials are effective in preventing air or other fluids within bladder 40 from transmitting or diffusing to the exterior of sport ball 10, U.S. Pat. Nos. 5,713,141 and 5,952,065 to Mitchell, et al., both of which are incorporated herein by reference, disclose materials that may substantially prevent transmission or diffusion. Although various configurations may be utilized, this material generally includes a first layer of thermoplastic polymer material and a second layer of barrier material. The thermoplastic polymer material provides the ability to form bonds between elements of the material, as well as a suitable degree of tensile strength, tear strength, flexural fatigue strength, modulus of elasticity, and abrasion resistance. The barrier material is effective in limiting the transmission of the fluid within bladder 40 (e.g., nitrogen). In some configurations, the thermoplastic polymer material may be a thermoplastic urethane. Moreover, the thermoplastic urethane may be selected from a group including polyester, polyether, polycaprolactone, polyoxypropylene and polycarbonate macroglycol based materials, and mixtures thereof. In some configurations, the barrier material may be selected from a group including ethylene-vinyl alcohol copolymer, polyvinylidene chloride, co-polymers of acrylonitrile and methyl acrylate, polyesters such as polyethyleneterephthalate, aliphatic and aromatic polyamides, liquid crystal polymers, and polyurethane engineering thermoplastics. Accordingly, bladder 40 may be formed from a variety of materials.

Figure 3A:
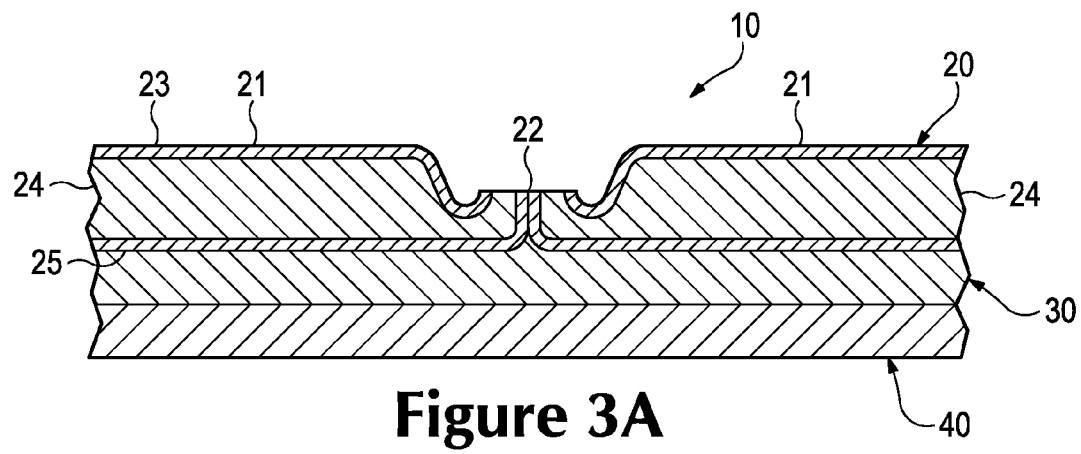
FIG. 3A is a cross-sectional view of a portion of the sport ball, as defined by section line 3-3 in FIG. 2.
Figure 3B:
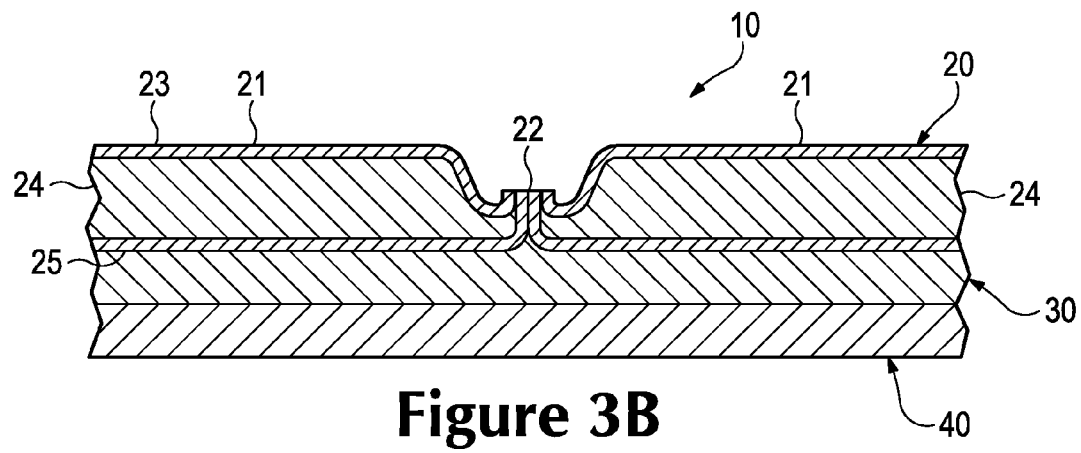
FIG. 3B is a cross-sectional view of a portion of another configuration of the sport ball, as defined by section line 3-3 in FIG. 2.

As illustrated in FIG. 3A, in some configurations, seam 22 may include a significant amount of material from middle layer 24 disposed between outer layer 23 and inner layer 25. FIG. 3B illustrates another configuration of seams 22, in which a minimal amount of middle layer material is disposed between outer layer 23 and inner layer 25 in the seam 22. During the welding process of joining the panels, the middle layer material may be substantially compressed, leaving only a thin layer of middle layer material between outer layer 23 and inner layer 25 in the seam 22.

Panel Bonding Process

Figure 4:
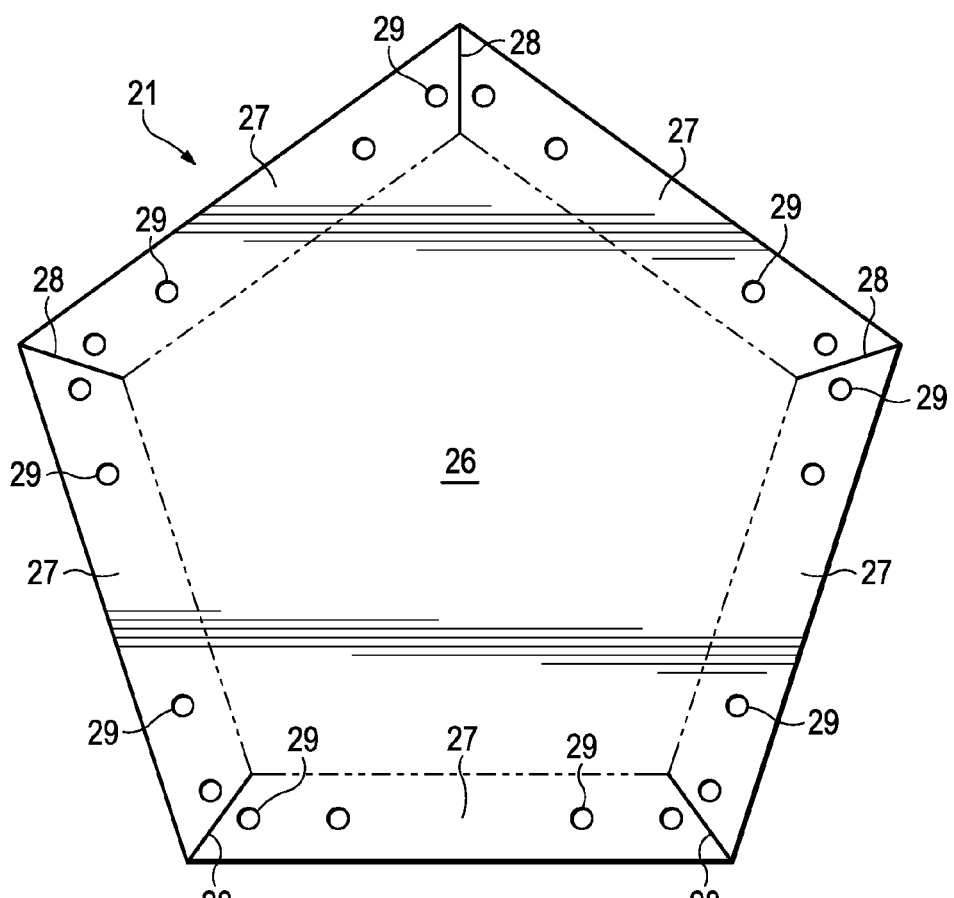
FIG. 4 is a top plan view of a panel of the sport ball.

The panels of conventional sport balls, as discussed above, may be joined with stitching (e.g., hand or machine stitching). Panels 21 are, however, joined through a bonding process. Referring to FIG. 4, one of panels 21 prior to being incorporated into sport ball 10 is depicted as having a panel area 26 and five flange areas 27. Whereas panel area 26 generally forms a central portion of panel 21, flange areas 27 form a peripheral portion of panel 21 and extend around panel area 26. For purposes of reference, dashed lines are depicted as extending between panel area 26 and the various flange areas 27. Panel 21 has a pentagonal shape and each of flange areas 27 correspond with one side region of the pentagonal shape. In further configurations where a panel has a different shape, the number of flange areas may change to correspond with the number of sides of the shape. Panel 21 defines five incisions 28 that extend inward from vertices of the pentagonal shape and effectively separate the various flange areas 27 from each other. Incisions 28 extend entirely through the thickness of panels 21 to disconnect flange areas 25 from each other and permit flange areas 27 to flex or otherwise move independent of each other, although flange areas 27 remain connected to panel area 26. Additionally, each flange area 27 defines various registration apertures 29 that form holes extending through panel 21.

Figure 5:
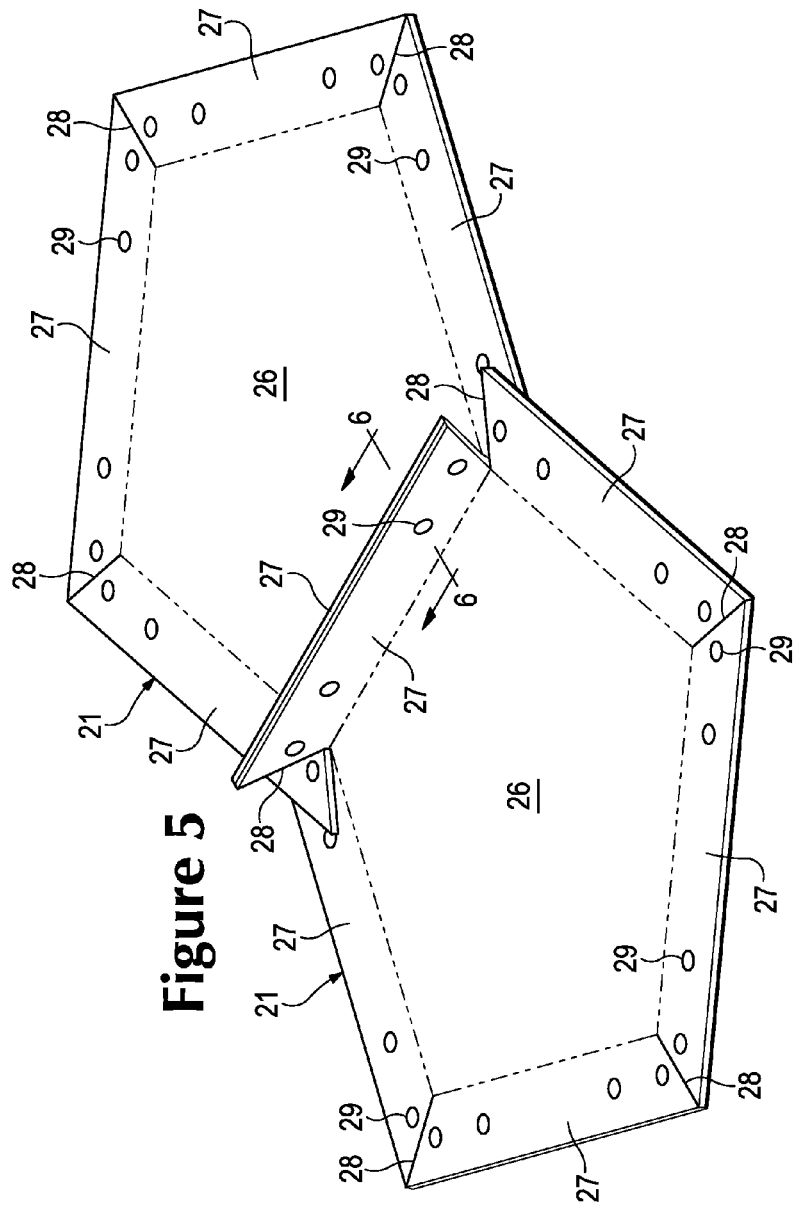
FIG. 5 is a perspective view of two joined panels.
Figure 6:
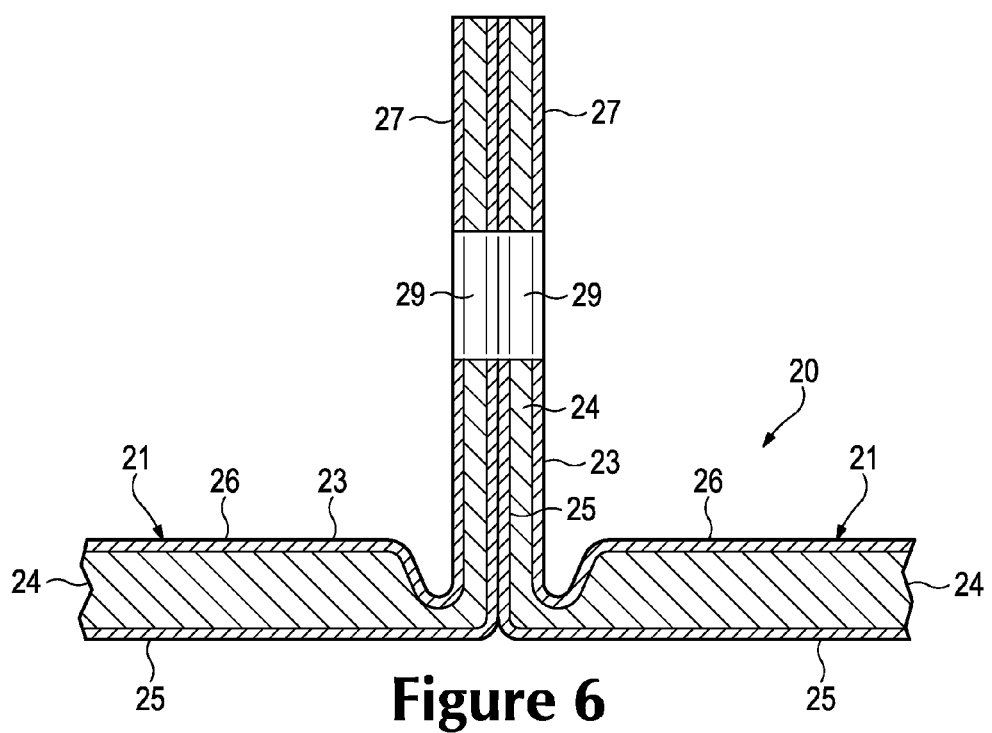
FIG. 6 is a cross-sectional view of the two joined panels, as defined by section line 6-6 in FIG. 5.

Panel areas 26 of the various panels 21 form a majority or all of the portion of casing 20 that is visible on the exterior of sport ball 10. A majority of each flange area 27, however, is trimmed or otherwise removed from casing 20 and is generally absent from sport ball 10. Seams 22 are formed at the interface between panel area 26 and flange areas 27, so relatively small portions of flange areas 27 may remain in casing 20, particularly at seams 22. Referring to FIGS. 5 and 6, an example of the manner in which two panels 21 are joined to each other in an intermediate manufacturing step is depicted. Although panel areas 26 are generally co-planar with each other, the joined flange areas 27 bend upward and are secured to each other along abutting surfaces. Additionally, registration apertures 29 from each of the joined flange areas 27 are aligned. By aligning registration apertures 29 prior to bonding, flange areas 27 are properly positioned relative to each other.

A variety of techniques may be utilized to bond flange areas 27 to each other including, adhesive bonding and thermal bonding. Referring to FIGS. 3 and 6, for example, surfaces of inner layers 25 lay against each other and are bonded to each other to form one of seams 22. In adhesive bonding, an adhesive may be located between inner layers 25 of adjacent panels 21 to bond inner layers 25 to each other, thereby joining the adjacent panels 21 and forming one of seams 22. In thermal bonding, heat may be applied to panels 21 to bond inner layers 25 to each other, thereby joining the adjacent panels 21 and forming one of seams 22. As discussed in greater detail below, thermal bonding generally involves the use of a thermoplastic polymer material to form seams 22.

When exposed to sufficient heat, thermoplastic polymer materials transition from a solid state to either a softened state or a liquid state. When sufficiently cooled, thermoplastic polymer materials then transition back from the softened state or the liquid state to the solid state. Based upon these properties of thermoplastic polymer materials, thermal bonding processes may be utilized to form a bond that joins portions of panels 21 (i.e., flange areas 27) to each other. As utilized herein, the term "thermal bonding" or variants thereof is defined as a securing technique between two elements that involves a softening or melting of a thermoplastic polymer material within at least one of the elements such that the elements are secured to each other when cooled. Similarly, the term "thermal bond" or variants thereof is defined as the weld, link, or structure that joins two elements through a process that involves a softening or melting of a thermoplastic polymer material within at least one of the elements such that the elements are secured to each other when cooled.

Various examples of thermal bonding will now be discussed. In a first thermal bonding process, two adjacent panels 21 may each be at least partially formed from thermoplastic polymer materials. The adjacent panels 21 are placed in contact with each other and heated to induce the thermoplastic polymer materials to melt or soften. The thermoplastic polymer materials then intermingle with each other (e.g., diffuse across a boundary layer between the thermoplastic polymer materials) and are secured together when cooled, thereby forming one of seams 22. In a second thermal bonding process, one of two adjacent panels 21 may each be at least partially formed from a thermoplastic polymer material. The adjacent panels 21 are placed in contact with each other and heated to induce the thermoplastic polymer material to melt or soften. The thermoplastic polymer material then infiltrates crevices or cavities formed in the other panel 21, and the panels 21 are secured together when cooled. In a third thermal bonding process, inner layers 25 from two adjacent panels 21 may each be at least partially formed from textiles that are pre-bonded to layers of thermoplastic polymer materials. The inner layers 25 are placed in contact with each other and heated to induce the thermoplastic polymer materials to melt or soften. The thermoplastic polymer materials within the adjacent inner layers 25 intermingle with each other (e.g., diffuse across a boundary layer between the thermoplastic polymer materials) and are secured together when cooled. In a fourth thermal bonding process, inner layers 25 from two adjacent panels 21 are formed from textiles. A sheet of thermoplastic polymer material is placed between inner layers 25 and heated to induce the thermoplastic polymer material to melt or soften. The thermoplastic polymer material then extends around or bonds with yarns, filaments, and fibers within inner layers 25. Upon cooling, the thermoplastic polymer material effectively joins inner layers 25 to each other. Thermal bonding may, therefore, occur when both, one, or neither of panels 21 includes thermoplastic polymer materials. Moreover, thermal bonding does not generally involve the use of stitching or adhesives, but involves directly bonding panels 21 to each other with heat. In some situations, however, stitching or adhesives may be utilized to supplement thermal bonding.

Figure 7:
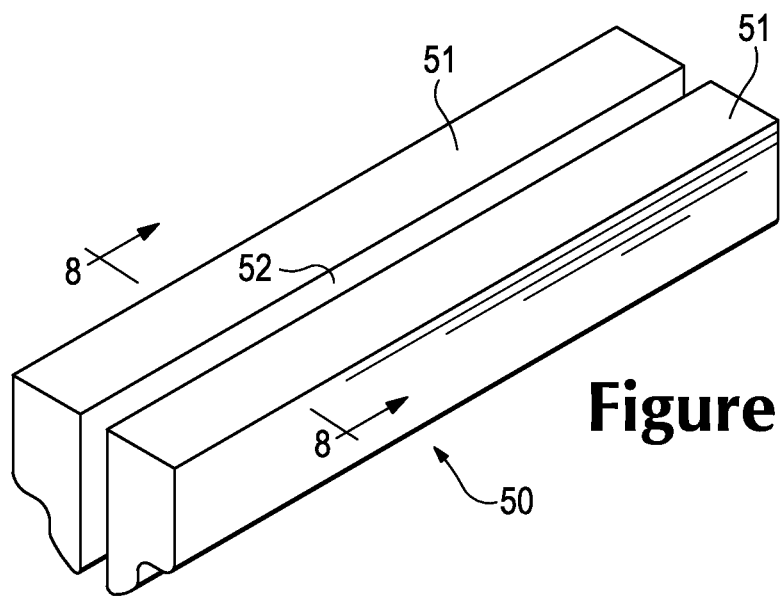
FIG. 7 is a perspective view of a bonding die utilized in joining the panels.
Figure 8:
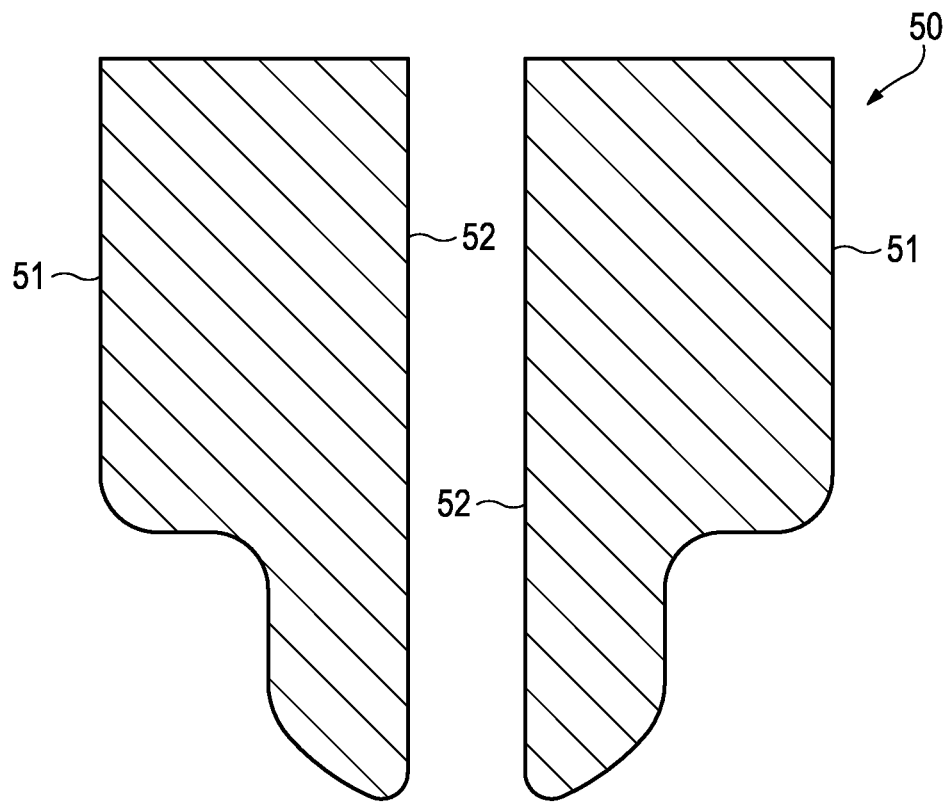
FIG. 8 is a cross-sectional view of the bonding die, as defined by section line 8-8 in FIG. 7.

A bonding die 50 that may be utilized to form seams 22 by bonding two flange areas 27 is depicted in FIGS. 7 and 8. Bonding die 50 includes two portions 51 that generally correspond in length with a length of one of the sides of panels 21. That is, the length of bonding die 50 is generally as long as or longer than the lengths of flange areas 27. Each portion 51 also defines a facing surface 52 that faces the other portion 51. That is, facing surfaces 52 face each other. If utilized for purposes of conduction heating, for example, portions 51 may each include internal heating elements or conduits that channel a heated liquid in order to sufficiently raise the temperature of bonding die 50 to form a thermal bond between flange areas 27. If utilized for purposes of radio frequency heating, one or both of portions 51 may emit radio frequency energy that heats the particular polymer material within panels 21. Another configuration of bonding die 50 may also heat flange areas 27 through ultrasonic heating. In addition to bonding die 50, a variety of other apparatuses that effectively form a thermal bond between panels 21 may be utilized.

Figure 9A:
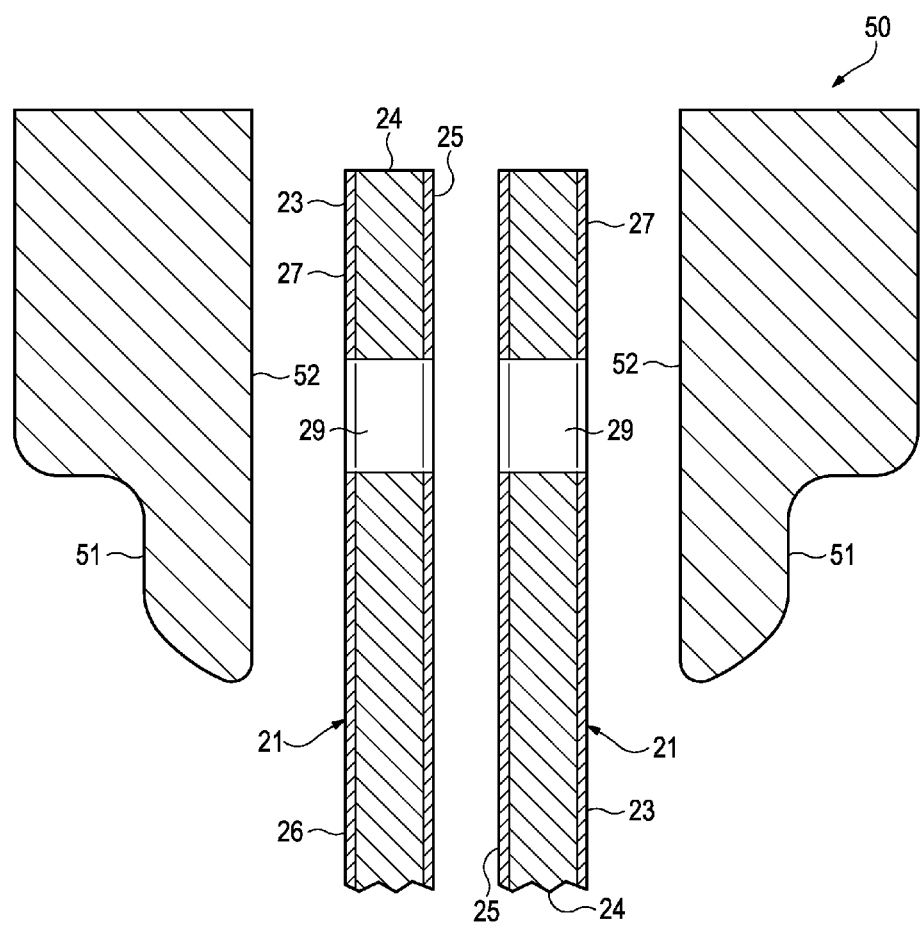
FIGS. 9A-9E are schematic cross-sectional views depicting steps of joining the panels together in a manufacturing process for the sport ball.
Figure 9B:
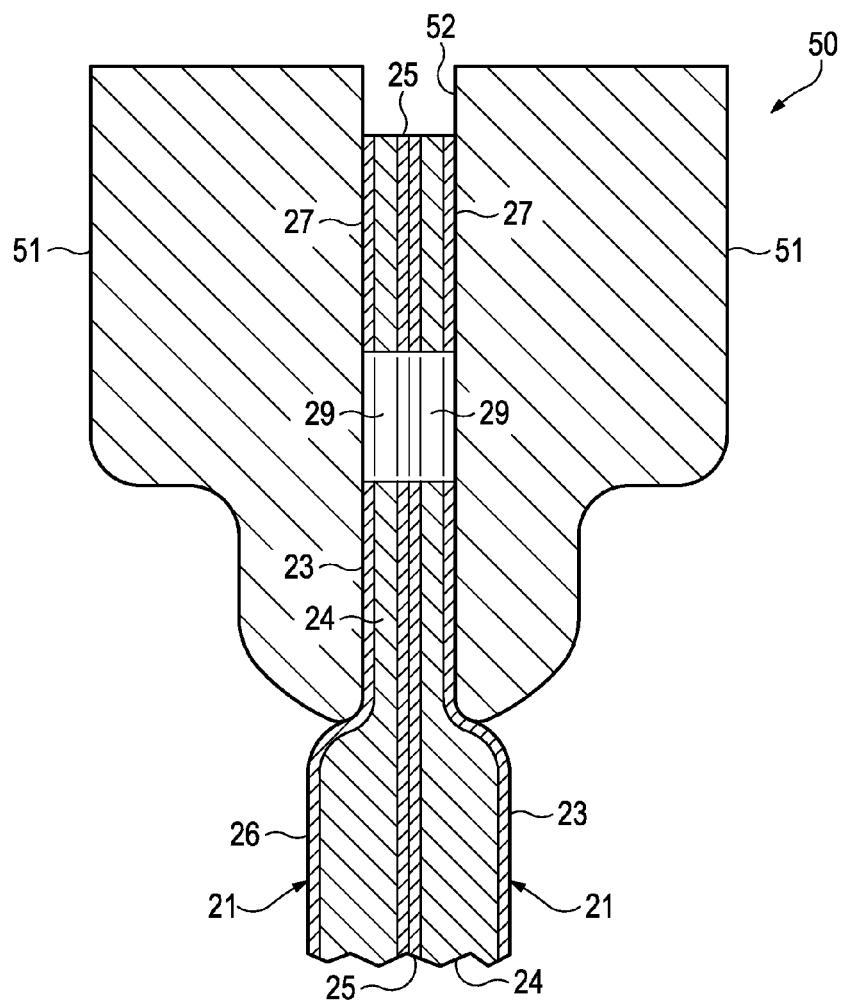

A general process for joining panels 21 with bonding die 50 will now be discussed with reference to FIGS. 9A-9E. Initially, two panels 21 are located such that (a) flange areas 27 are adjacent to each other, (b) surfaces of inner layers 25 face each other, and (c) registration apertures 29 are generally aligned, as depicted in FIG. 9A. Portions 51 of bonding die 50 are also located on opposite sides of flange areas 27. Referring to FIG. 9B, portions 51 then compress flange areas 27 together between facing surfaces 52 to cause surfaces of inner layers 25 to contact each other. By heating flange areas 27 with bonding die 50, the thermoplastic polymer materials within inner layers 25 melt or otherwise soften to a degree that facilitates thermal bonding between flange areas 27. By compressing flange areas 27 with bonding die 50, one or more of layers 23-25 also compress. For example, middle layer 24 may be formed from a polymer foam material, and the heat and compression from bonding die may compress middle layer 24 and effectively reduce the thickness of middle layer 24 in the area between portions 51.

In some configurations, inner layers 25 both incorporate thermoplastic materials that are heated during the step depicted in FIG. 9B. For example, inner layers 25 may be formed from sheets of thermoplastic polymer material, inner layers 25 may be textiles that are impregnated with thermoplastic polymer material (e.g., a polyester and cotton textile bonded to a thermoplastic polymer sheet), or inner layers 25 may be a textile having yarns formed from a thermoplastic polymer material. As noted above, however, thermal bonding may occur when both, one, or neither of panels 21 includes thermoplastic polymer materials. As such, thermal bonding may occur when only one of inner layers 25 incorporates a thermoplastic polymer material. Moreover, in situations where neither of inner layers 25 incorporates thermoplastic polymer materials, a thermoplastic polymer element may be placed between panels 21 in FIG. 9A, and the thermoplastic polymer element may be compressed and heated between panels 21 in FIG. 9B, thereby forming a thermal bond that joins inner layers 25.

Figure 9C:
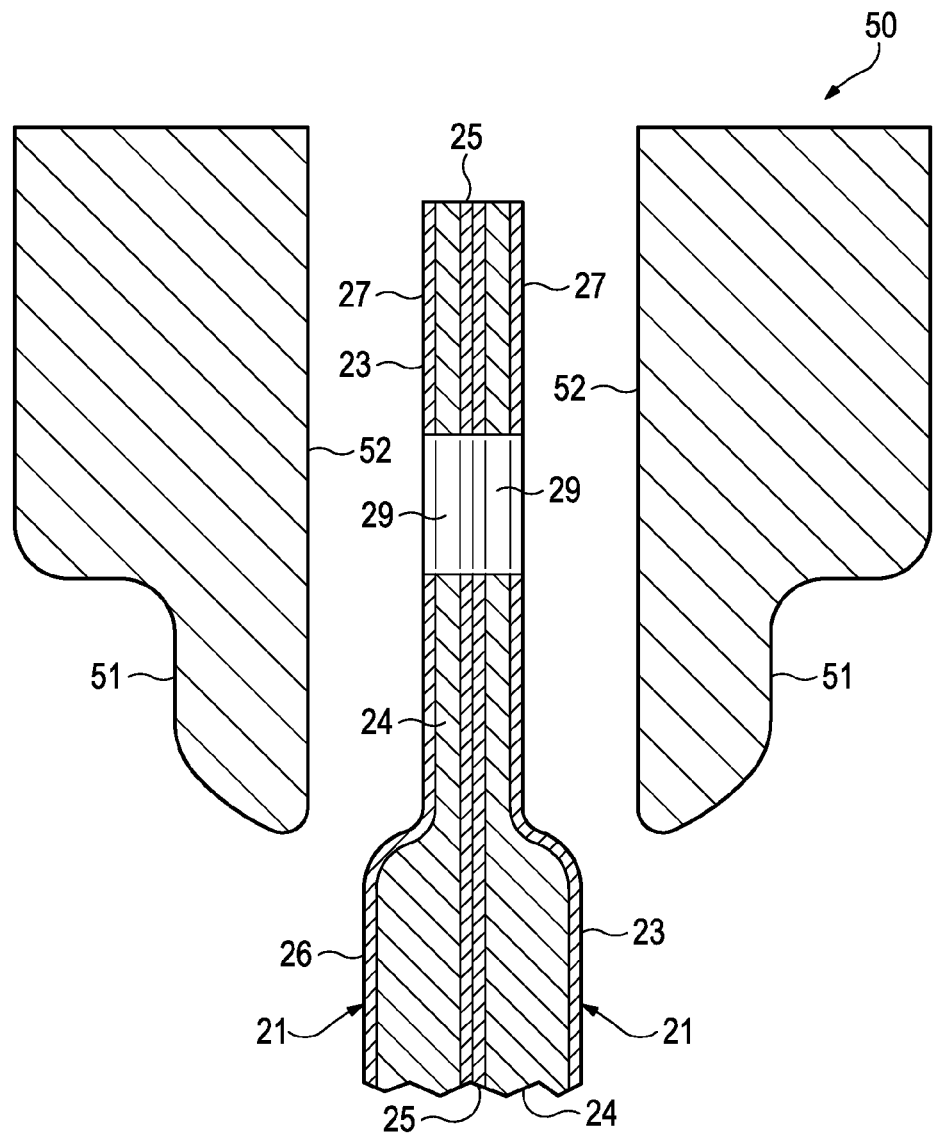
Figure 9D:
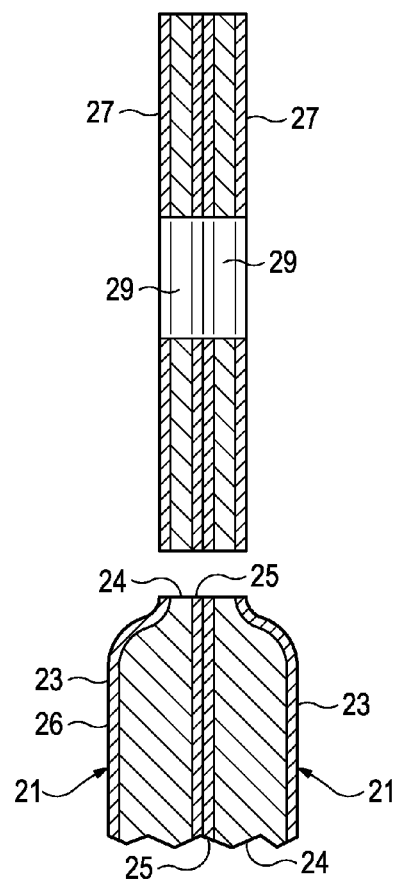
Figure 9E:
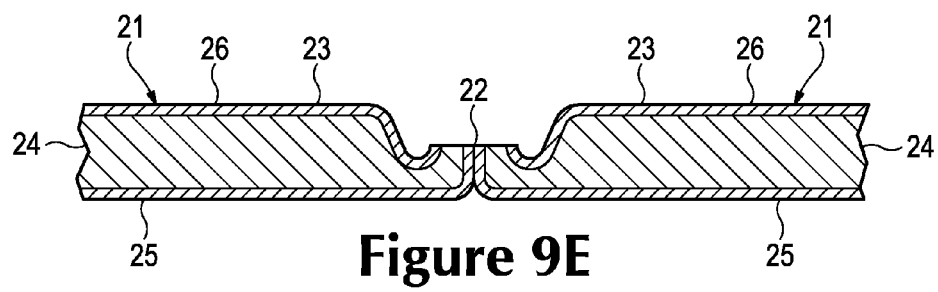

Following heating and compression, portions 51 separate and move away from panels 21, as depicted in FIG. 9C. At this stage, panels 21 are permitted to cool, thereby ensuring that the thermoplastic polymer material forming the thermal bond between inner layers 25 may solidify. Also, middle layer 24 generally remains compressed. More particularly, the heat and compression from bonding die 50 may melt portions of the polymer foam material of middle layer 24 or may collapse cells within middle layer 24 to retain the compressed configuration when portions 51 are separated. Excess portions of flange areas 27, which may include areas that define registration apertures 29, are then trimmed or otherwise removed, as depicted in FIG. 9D. The two panel areas 26 are then rotated or separated, as depicted in FIG. 9E, to reveal the formation of seam 22.

An advantage of the bonding process discussed above is that seam 22 is recessed below a majority of the outer surface of casing 20, which is formed by outer layer 23. Moreover, the edges of panels 21 that were trimmed following thermal bonding are also recessed below a majority of the outer surface of casing 20. This configuration effectively forms indentations between panels 21 and at seams 22. During the bonding process, bonding die 50 compressed panels 21 (e.g., compressed middle layer 24). Due to this compression, the thickness of panels 21 in the area of seam 22 is reduced, which permits seam 22 and the trimmed edges of panels 21 to form indentations and remain recessed below the outer surface of casing 20. In this configuration, panels 21 each have a lesser thickness adjacent to seam 22 than in areas spaced from seam 22.

Figure 10:
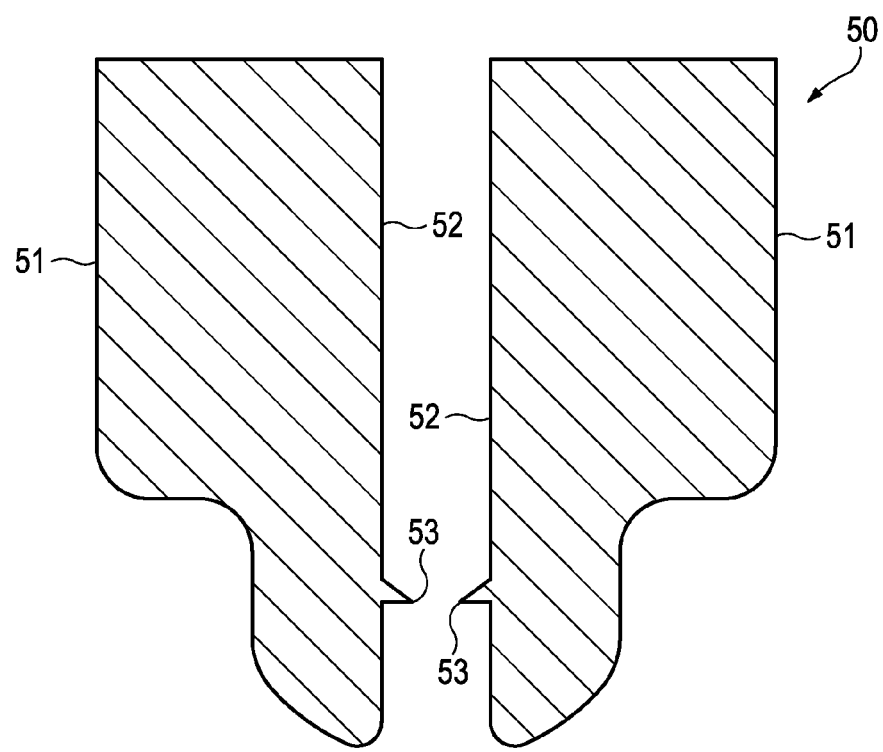
FIG. 10 is a cross-sectional view that corresponds with FIG. 8 and depicts another configuration of the bonding die.

A variety of trimming processes may be utilized to remove the excess portions of flange areas 27. As examples, the trimming processes may include the use of a laser cutting apparatus, a die cutter, a grinding wheel, or an etching process. As another example, bonding die 50 may incorporate cutting edges 53, as depicted in FIG. 10, that trim flange areas 27 during the bonding process. That is, cutting edges 53 may be utilized to simultaneously protrude through flange areas 27 and effectively trim flange areas 27 as portions 51 heat and compress flange areas 27 together between facing surfaces 52.

The bonding process disclosed in FIGS. 9A-9E forms seams 22 to have a configuration that effectively protrudes outward and toward an exterior of sport ball 10. Through the bonding process, inner layers 25, which form an interior surface of casing 20, lay against each other and are bonded to each other. That is, the interior surfaces of panels 21 lay against each other and are joined to each other to form seams 22, which have an outwardly-protruding configuration. Due to the compression of panels 21 (e.g., the compression in middle layer 24) in the areas where the bond is formed, as well as the trimming of excess portions of flange areas 27, seams 22 and the trimmed edges of panels 21 are recessed below a majority of the outer surface of casing 20.

As an additional matter, seams 22 formed through the bonding process discussed above have a configuration that exposes a portion of an edge of each panel 21 to the exterior of sport ball 10. That is, the edges of panels 21 form a portion of an outer surface of sport ball 10 and casing 20 at seams 22. Referring to FIG. 9E, for example, the areas of panels 21 that are trimmed exposes the edges of each of layers 23-25, thereby exposing edges of panels 21. An advantage of this configuration is that seams 22 may exhibit a unique aesthetic quality that distinguishes sport ball 10 from conventional sport balls.

Sport Ball Formation

Figure 11A:
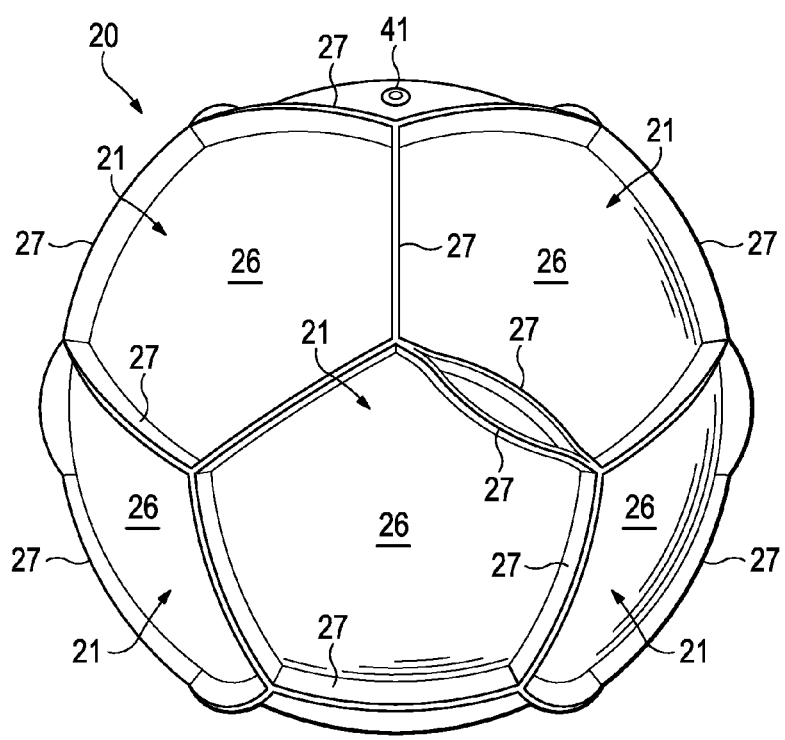
FIGS. 11A-11D are perspective views depicting further steps in the manufacturing process for the sport ball.
Figure 11B:
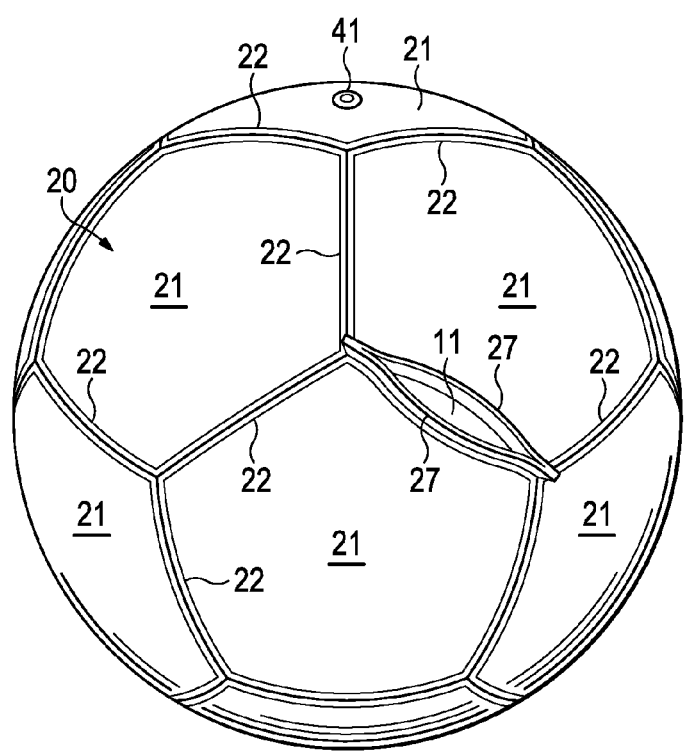

The general process of bonding flange areas 27 to form seams 22 between panels 21 was generally discussed above relative to FIGS. 9A-9E. This general process may be repeatedly performed with multiple panels 21 and on multiple flange areas 27 of each panel 21 to effectively form casing 20 to have a generally spherical or closed structure. More particularly, a majority of flange areas 27 from the various panels 21 in casing 20 may be bonded together to form the structure in FIG. 11A. Once bonded, excess portions of flange areas 27 may be trimmed to effectively complete the formation of seams 22, as depicted in FIG. 11B. In some processes, flange areas 27 may be trimmed immediately after forming each bond, rather than after forming each of the bonds between flange areas 27.

Figure 11C:
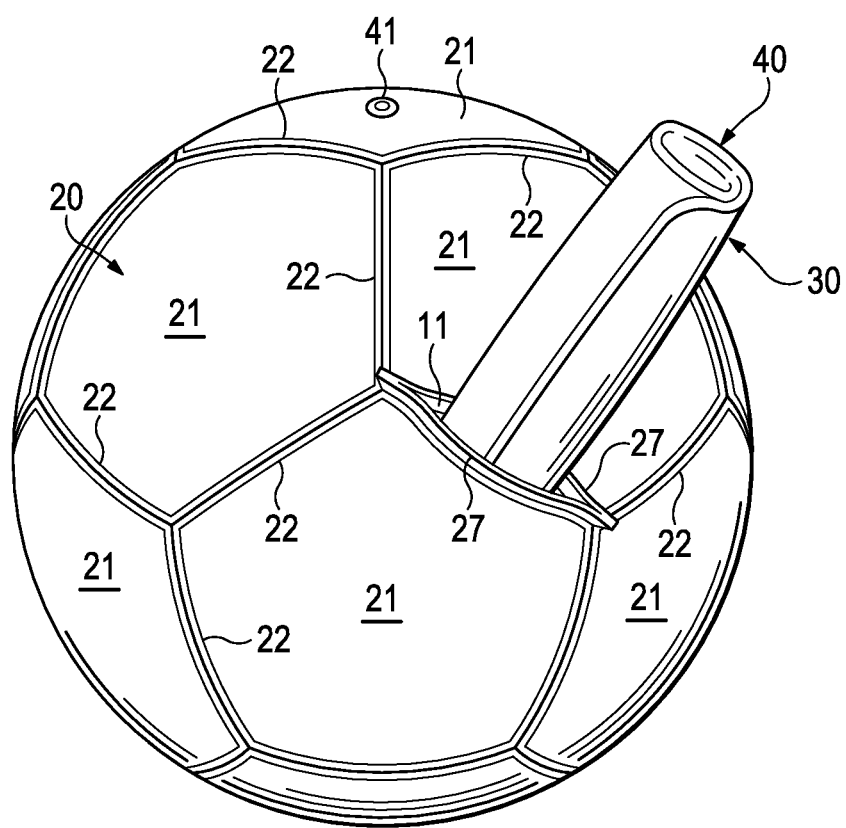
Figure 11D:
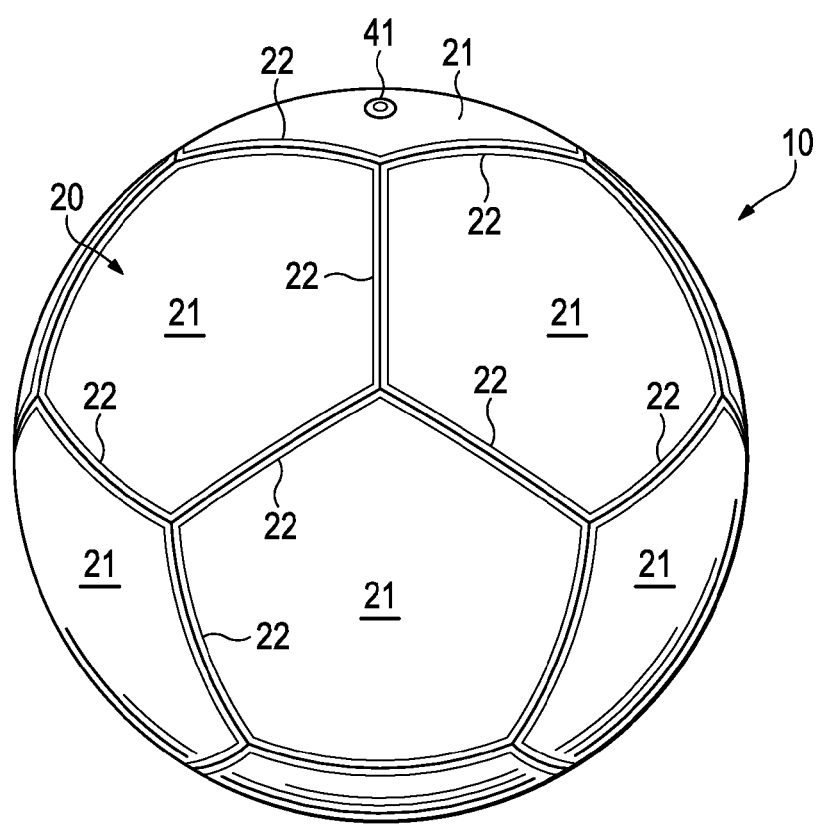

Although seams 22 are generally formed between each of flange areas 27, at least one of seams 22 may remain unbonded to each other at this stage of the manufacturing process. Referring to FIGS. 11A and 11B, two unbonded flange areas 27 form an opening 11 in casing 20. One purpose of leaving at least two flange areas 27 unbonded to each other, thereby forming opening 11, is that restriction structure 30 and bladder 40 may now be inserted into casing 20, as depicted in FIG. 11C. Once restriction structure 30 and bladder 40 are properly positioned, including placing valve 41 through an aperture in one of panels 21, the final two flange areas 27 may be bonded and trimmed to form the final seam 22, as depicted in FIG. 11D.

As discussed above, the configuration of seams 22 varies from conventional seams. More particularly, many conventional seams protrude inward, whereas seams 22 protrude outward. An advantage to utilizing a bonding process that forms seams 22 in this manner is that panels 21 may be joined from the exterior of casing 20. Referring to FIGS. 11A-11D, for example, casing 20 is formed right side out, as opposed to inside out. That is, since seams 22 protrude outward, panels 21 may be joined without having to turn casing 20 inside out, as access to seams 22 is provided with casing 20 oriented right side out.

Based upon the above discussion, casing 20 may be at least partially formed by joining panels 21 through a bonding process. In comparison with other methods of joining panels, the bonding process may reduce the overall mass of sport ball 10 and increase manufacturing efficiency. Once the bonding process is utilized to join a majority of panels 21, opening 11 in casing 20 may be utilized to insert restriction structure 30 and bladder 40, and opening 11 may subsequently be sealed by forming a final seam 22.

Integrated Bladder Configuration

Figure 12:
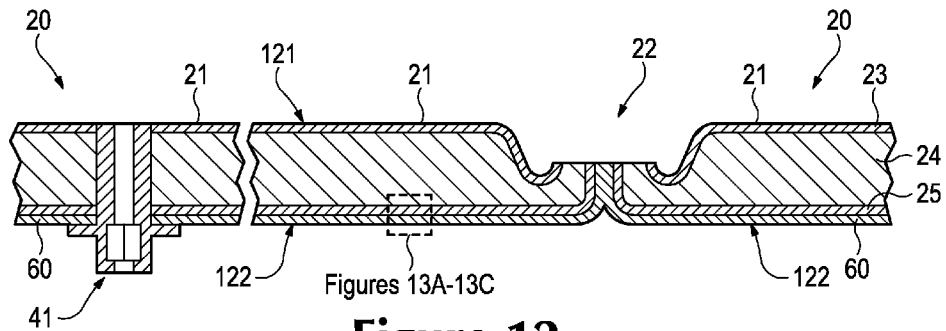
FIG. 12 is a cross-sectional view corresponding with FIG. 3 and depicting another configuration of the sport ball.

Another configuration of ball 10 is depicted in FIG. 12. As shown in FIG. 12, ball 10 may include a plurality of panels 21 defining a first surface forming a majority of an exterior surface 121 of the ball. In this configuration, ball 10 may include an interior layer 60 that is secured to inner layer 25 of panels 21, and thus forms the interior surface 122 of ball 10. As shown in FIG. 12, valve 41 extends through casing 20 and is secured to interior layer 60. Given that interior layer 60 forms the interior surface of each panel 21 and is bonded at seams 22 between each of panels 21, interior layer 60 forms a sealed structure within ball 10 for retaining the pressurized fluid. For example, interior layer 60 may extend between the panels to join the panels together. Accordingly, interior layer 60 may form substantially all of the interior surface 122 of ball 10 to ensure that the fluid is properly retained within ball 10. In one area, however, valve 41 is joined with interior layer 60 and may extend through interior layer 60 to facilitate inflation of ball 10.

In some embodiments, ball 10 may be substantially formed by casing 20 and valve 41, as shown in FIG. 12. In other configurations, additional layers and/or other components may also be included. For example, a restriction structure similar to restriction structure 30 may include one or more layers incorporated into ball 10 in order to limit expansion of casing 20 when ball 10 is pressurized. In some configurations, the restriction structure may be incorporated into casing 20. As an example, inner layer 25 may be formed from a substantially non-stretch textile that limits stretch. In another configuration, valve 41 may be absent from ball 10 in order to impart an entirely sealed structure to interior layer 60 that is permanently inflated. Additionally, the exterior surface of casing 20 may include graphics layers or other features that enhance the aesthetics of ball 10.

Interior layer 60 imparts two advantages to ball 10. First, interior layer 60 is utilized to join adjacent panels 21 to each other, thereby forming seams 22. More particularly, the general bonding process discussed above or a similar bonding process may be utilized to join interior layer 60 from two adjacent panels 21 and form seam 22. Second, interior layer 60 forms a sealed structure within ball 10 that retains a pressurized fluid. In the configurations of ball 10 discussed above, bladder 40 is located within casing 20 to retain the pressurized fluid that inflates ball 10. In this configuration, however, interior layer 60 encloses and retains the pressurized fluid.

Figure 13A:
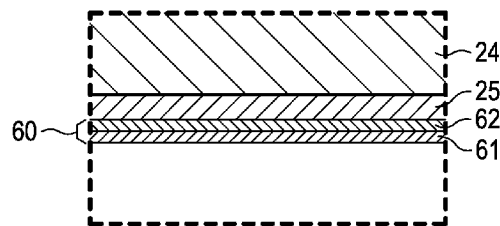
FIGS. 13A-13C are detailed cross-sectional views of the sport ball, as defined in FIG. 12.
Figure 13B:
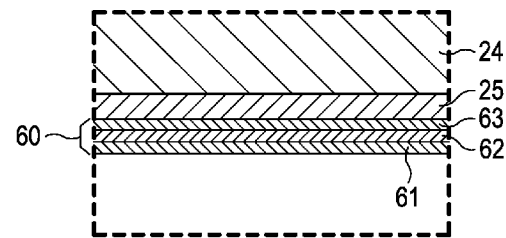

Interior layer 60 may be formed from a layered material in order to impart both bonding and fluid retention to ball 10. Referring to FIG. 13A, for example, interior layer 60 includes a first layer 61 and a second layer 62. Whereas first layer 61 forms the interior surface of casing 20, second layer 62 is joined to both first layer 61 and inner layer 25. An advantage of this layered configuration is that the properties of the material forming first layer 61 and the properties of the material forming second layer 62 are effectively combined. For example, first layer 61 may be formed from a thermoplastic polymer material that facilitates thermal bonding and the formation of seams 22, and second layer 62 may be formed from a barrier material that substantially prevents or reduces the transmission of the fluid contained within interior layer 60. As another configuration, FIG. 13B depicts a layered structure that includes a third layer 63. In this configuration, all three of layers 61-63 may be formed from different materials with properties that are beneficial to ball 10. Alternately, layers 61 and 63 may be formed from the same material, with second layer 62 being formed from a different material. For example, layers 61 and 63 may be formed from a thermoplastic polymer material, and second layer 62 may be formed from a barrier material. Accordingly, the structure of the materials within interior layer 60 may vary considerably.

In structuring the interior layer 60, consideration may be given to the relative positions of layers that include thermoplastic polymer material and layers that include barrier material. In the general bonding process discussed above, flange areas 27 from two adjacent panels 21 are placed in contact with each other and then heated and compressed to form seam 22. Moreover, the interior surfaces of panels 21, which contact each other during the bonding process, incorporate a thermoplastic polymer material to facilitate the formation of a thermal bond. As such, forming first layer 61 from the thermoplastic polymer material has an advantage of placing the thermoplastic polymer material at the interior surface where thermal bonding occurs. Additionally, forming third layer 63 from the thermoplastic polymer material has an advantage of placing the thermoplastic polymer material at a surface that bonds or otherwise joins with inner layer 25. Examples of thermoplastic polymer materials that may be utilized within interior layer 60 include thermoplastic polyurethane, urethane, polyester, polyester polyurethane, polyether, polyether polyurethane, latex, polycaprolactone, polyoxypropylene, polycarbonate macroglycol, and mixtures thereof.

In general, the fluid contained by ball 10 will be air that is introduced through valve 41. Air primarily includes molecules in the following proportions: 78 percent nitrogen, 21 percent oxygen, less than one percent argon and carbon dioxide, and small amounts of other gasses. Depending upon humidity levels, air also includes an average of about one percent water vapor. As such, selecting a material with the ability to substantially prevent the transmission of nitrogen or oxygen may be effective in limiting transmission of the fluid contained by interior layer 60, thereby limiting changes in pressure within ball 10. Other fluids that may be contained by interior layer 60 include sulfur-hexafluoride and substantially pure nitrogen.

An example of a material that is effective in limiting transmission of is disclosed in U.S. Pat. Nos. 5,713,141 and 5,952,065 to Mitchell, et al., both of which are incorporated herein by reference. Although various configurations may be utilized, this material generally includes a first layer of thermoplastic polymer material and a second layer of barrier material. The thermoplastic polymer material provides the ability to form thermal bonds, as well as a suitable degree of tensile strength, tear strength, flexural fatigue strength, modulus of elasticity, and abrasion resistance. The barrier material is effective in limiting the transmission of the fluid within interior layer 60 (e.g., nitrogen). In some configurations, the thermoplastic polymer material may be a thermoplastic urethane. Moreover, the thermoplastic urethane may be selected from a group including polyester, polyether, polycaprolactone, polyoxypropylene and polycarbonate macroglycol based materials, and mixtures thereof. In some configurations, the barrier material may be selected from a group including ethylene-vinyl alcohol copolymer, polyvinylidene chloride, co-polymers of acrylonitrile and methyl acrylate, polyesters such as polyethyleneterephthalate, aliphatic and aromatic polyamides, liquid crystal polymers, and polyurethane engineering thermoplastics. In the configuration of FIG. 13A, for example, the thermoplastic urethane may form first layer 61 and the barrier material (e.g., ethylene-vinyl alcohol copolymer) may form second layer 62. As another example, which relates the configuration of FIG. 13B, the thermoplastic urethane may form layers 61 and 63 and the barrier material (e.g., ethylene-vinyl alcohol copolymer) may form second layer 62. In some configurations, interior layer 60 may be formed from other layered materials, including a material disclosed in U.S. Pat. Nos. 6,082,025 and 6,127,026 to Bonk, et al., both of which are incorporated herein by reference.

Additional suitable materials are disclosed in U.S. Pat. Nos. 4,183,156 and 4,219,945 to Rudy, which is incorporated herein by reference. For example, suitable materials may include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340; 6,203,868; and 6,321,465 to Bonk, et al. The entire disclosures of these patents are hereby incorporated by reference.

Figure 13C:
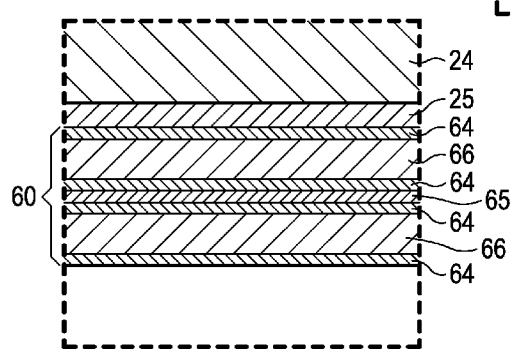

Another example of a material that is effective in limiting the transmission of fluid (e.g., nitrogen) is depicted in FIG. 13C. This material includes a multi-layered configuration that has four layers 64, one layer 65, and two layers 66. Layers 64 may be a thermoplastic urethane, including any selected from a group including polyester, polyether, polycaprolactone, polyoxypropylene and polycarbonate macroglycol based materials, and mixtures thereof. Layer 65 may be ethylene-vinyl alcohol copolymer. Additionally, layers 66 may be a regrind or mixture of thermoplastic urethane and ethylene-vinyl alcohol copolymer, potentially from recycled portions of this material. Note that a central portion of this material includes two layers 64 formed from thermoplastic urethane located on opposite sides of one layer 65 formed from ethylene-vinyl alcohol copolymer.

U.S. Patent Application Publication Number 2010/0240479 to Raynak, et al., which is incorporated herein by reference, discloses another process by which panels may be joined and a sport ball may be formed. As with the process discussed above, the process in the Publication involves (a) bonding panels to form seams of a casing, (b) inserting components into the casing through an opening in the casing, and (c) closing the opening by forming a final seam at a location of the opening. Although the bonding process discussed above may be utilized to form all seams in a sport ball (e.g., sport ball 10), the bonding process may also be utilized to form a final seam in the sport ball disclosed in the Publication. Accordingly, the bonding process disclosed herein may be applied to a variety of sport balls formed through various processes.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims. Further, it will be noted that any of the concepts discussed with respect to any of the disclosed configurations may be used with any of the other disclosed configurations.

The invention claimed is:

1. A method of manufacturing a sport ball, the method comprising:
   joining together a first panel and a second panel to form a casing, wherein each of the first panel and the second panel have:
      a first surface;
      a second surface opposite the first surface;
      an interior layer abutting the second surface; and
      an edge;
   wherein joining includes bonding together the interior layer of the first panel and the interior layer of the second panel to form substantially all of an interior surface of the sport ball that is configured to retain a fluid within the sport ball; and
   concurrent to joining, orienting the first panel and the second panel such that:
      (a) the first surface of the first panel and the first surface of the second panel face outward toward an exterior of the sport ball,
      (b) the second surface of the first panel and the second surface of the second panel face inward toward an interior of the sport ball; and
      (c) the edge of the first panel and the edge of the second panel form an exterior surface of the sport ball.

2. The method recited in claim 1, wherein joining includes applying heat to form a thermal bond between the first panel and the second panel.

3. The method recited in claim 2, wherein each of the first panel and the second panel further include a flange area; and
   wherein joining includes:
      placing the flange area of the first panel in contact with the flange area of the second panel;
      compressing the flange area of the first panel and the flange area of the second panel together; and
      heating the flange area of the first panel and the flange area of the second panel to form a flange joint.

4. The method recited in claim 3, wherein the flange area of the first panel includes a first free edge and the flange area of the second panel includes a second free edge; and
   wherein placing includes orienting the first free edge and the second free edge so that the first free edge and the second free edge extend radially outward from a center of the sport ball.

5. The method recited in claim 1, wherein joining forms a chamber that is defined by the interior surface; and wherein the interior layer of the first panel and the interior layer of the second panel include a first layer formed from a thermoplastic polymer and a second layer formed from an ethylene-vinyl alcohol copolymer.

6. The method recited in claim 5, wherein the thermoplastic polymer is a thermoplastic urethane.

7. The method recited in claim 6, wherein the thermoplastic urethane is selected from the group consisting of polyester, polyether, polycaprolactone, polyoxypropylene, polycarbonate macroglycol based materials, and mixtures thereof.

8. A method of manufacturing a sport ball, the method comprising:
   joining a plurality of panels to one another at a plurality of seams to form a casing, wherein a first one of the plurality of panels and a second one of the plurality of panels have:
      a first surface;
      a second surface opposite the first surface;
      an interior layer abutting the second surface; and
      an edge; and
   wherein joining includes bonding together the interior layer of the first one of the plurality of panels and the interior layer of the second one of the plurality of panels to form substantially all of an interior surface of the sport ball that is configured to retain a fluid within the sport ball; and
   concurrent to joining, orienting the first panel and the second panel right side out such that:
      (a) the first surface of the first one of the plurality of panels and the first surface of the second one of the plurality of panels face outward toward an exterior of the sport ball;
      (b) the second surface of the first one of the plurality of panels and the second surface of the second one of the plurality of panels face inward toward an interior of the sport ball; and
      (c) the edge of the first one of the plurality of panels and the edge of the second one of the plurality of panels form an exterior surface of the sport ball;
   wherein joining forms a chamber that is defined by the interior surface; and
   wherein the interior layer of the first one of the plurality of panels and the interior layer of the second one of the plurality of panels include a first layer formed from a thermoplastic polymer and a second layer formed from an ethylene-vinyl alcohol copolymer.

9. The method recited in claim 8, wherein the thermoplastic polymer a thermoplastic urethane.

10. The method recited in claim 9, wherein the thermoplastic urethane is selected from the group consisting of polyester, polyether, polycaprolactone, polyoxypropylene, polycarbonate macroglycol based materials, and mixtures thereof.

11. The method recited in claim 8, wherein the interior layer of the first one of the plurality of panels and the interior layer of the second one of the plurality of panels further include a third layer disposed between the first layer and the second layer; and wherein the third layer is formed from a mixture of a thermoplastic urethane and an ethylene-vinyl alcohol copolymer.

12. The method recited in claim 8, wherein joining includes defining a plurality of indentations between the plurality of panels at the plurality of seams along the exterior surface.

13. A method of manufacturing a sport ball, the method comprising:
   joining a first panel and a second panel to one another at seam to form a casing;
   wherein the first panel and the second panel have:
      a first surface;
      a second surface opposite the first surface;
      an interior layer abutting the second surface;
      a central portion;
      a flange area spaced apart from the central portion; and an edge disposed along the flange area;
wherein joining includes:
- bonding together the interior layer of the first panel and the interior layer of the second panel to form substantially all of an interior surface of the sport ball that is configured to retain a fluid within the sport ball;
- turning the flange area of the first panel toward an exterior of the sport ball;
- turning the flange area of the second panel toward the exterior;
- concurrent to joining, abutting the first flange area of the first panel to the flange area of the second panel, thereby orienting the first panel and the second panel right side out such that:
  - (a) the first surface of the first panel and the first surface of the second panel face toward the exterior;
  - (b) the second surface of the first panel and the second surface of the second panel face inward toward an interior of the sport ball; and
  - (c) the edge of the first panel and the edge of the second panel form an exterior surface of the sport ball; and
- bonding together the second surface of the first panel and the second surface of the second panel at the flange area of the first panel and the flange area of the second panel to form the interior layer;
- wherein the interior layer of the first panel and the interior layer of the second panel are configured for enclosing a pressurized fluid within the casing.

14. The method recited in claim 13, wherein the interior layer of the first panel and the interior layer of the second panel include a first layer formed from a thermoplastic polymer and a second layer formed from a barrier material that is configured to limit transmission of the pressurized fluid.

15. The method recited in claim 14, wherein the barrier material is formed from an ethylene-vinyl alcohol copolymer.

16. The method recited in claim 14, wherein the thermoplastic polymer is a thermoplastic urethane.

17. The method recited in claim 16, wherein the thermoplastic urethane is selected from the group consisting of polyester, polyether, polycaprolactone, polyoxypropylene, polycarbonate macroglycol based materials, and mixtures thereof.

18. The method recited in claim 13, wherein joining includes forming the exterior surface to define a plurality of indentations between the plurality of panels at the seam.

19. The method recited in claim 13, wherein joining the first panel to the second panel further includes:
- compressing the flange area of the first panel and the flange area of the second panel together; and
- heating the flange area of the first panel and the flange area of the second panel to form a flange joint.

20. The method recited in claim 19, wherein the flange area of the first panel includes a first free edge and the flange area of the second panel includes a second free edge; and
wherein turning includes orienting the first free edge and the second free edge so that the first free edge and the second free edge extend radially outward from a center of the sport ball.

* * * * *

UNITED STATES PATENT AND TRADEMARK OFFICE
CERTIFICATE OF CORRECTION

PATENT NO. : 9,457,239 B2
APPLICATION NO. : 14/490909
DATED : October 4, 2016
INVENTOR(S) : Vincent F. White et al.

It is certified that error appears in the above-identified patent and that said Letters Patent is hereby corrected as shown below:

In the Claims

Column 14, Line 21 should read: second panel right-side out such that:

Column 15, Line 15 should read: right-side out such that:

Signed and Sealed this
Seventh Day of March, 2017

Michelle K. Lee
*Director of the United States Patent and Trademark Office*